United States Patent
Batchvarov

(10) Patent No.: US 7,548,259 B2
(45) Date of Patent: Jun. 16, 2009

(54) SYSTEM AND METHOD FOR PRODUCING A HIGHER RESOLUTION STILL IMAGE FROM VIDEO INFORMATION

(75) Inventor: Andrey Borissov Batchvarov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 10/916,535

(22) Filed: Aug. 12, 2004

(65) Prior Publication Data

US 2006/0034533 A1 Feb. 16, 2006

(51) Int. Cl.
*H04N 5/225* (2006.01)
(52) U.S. Cl. .................................... 348/218.1
(58) Field of Classification Search ............... 348/218.1; 382/280, 284, 294, 299, 232–253, 245; 358/1.9, 358/2.1; 384/218.1
See application file for complete search history.

(56) References Cited

U.S. PATENT DOCUMENTS

| | | | | |
|---|---|---|---|---|
| 5,581,362 A | * | 12/1996 | Sakaue et al. ................. 386/95 |
| 5,809,202 A | * | 9/1998 | Gotoh et al. ................... 386/69 |
| 5,978,021 A | * | 11/1999 | Kim ......................... 348/218.1 |
| 6,295,376 B1 | * | 9/2001 | Nakaya ....................... 382/236 |
| 6,360,018 B1 | * | 3/2002 | Nozawa ...................... 382/248 |
| 6,546,144 B1 | * | 4/2003 | Fukuhara et al. ............ 382/240 |
| 6,992,707 B2 | * | 1/2006 | Obrador .................... 348/220.1 |
| 7,030,934 B2 | * | 4/2006 | Shy et al. ..................... 348/584 |
| 2001/0035969 A1 | * | 11/2001 | Kishimoto .................. 358/1.9 |
| 2002/0028026 A1 | * | 3/2002 | Chen et al. .................. 382/284 |
| 2003/0179294 A1 | * | 9/2003 | Martins ....................... 348/157 |
| 2003/0193567 A1 | * | 10/2003 | Hubel ....................... 348/207.1 |
| 2004/0032409 A1 | * | 2/2004 | Girard ........................ 345/426 |
| 2004/0120606 A1 | * | 6/2004 | Fredlund .................... 382/305 |
| 2004/0165075 A1 | * | 8/2004 | Okada et al. ........... 348/207.99 |

\* cited by examiner

*Primary Examiner*—Tuan V Ho
*Assistant Examiner*—Kent Wang
(74) *Attorney, Agent, or Firm*—Shook, Hardy & Bacon L.L.P.

(57) ABSTRACT

A method and system are provided for creating a higher resolution still image from a multiple video frames having a lower resolution. The system includes a sampling mechanism for extracting multiple video frames captured by a video recording device and an output mechanism for outputting a single high resolution still image from the multiple extracted video frames. The system may include an analysis module for performing an analysis to determine if the selected lower resolution video frames can be combined into a single higher resolution still image.

12 Claims, 5 Drawing Sheets

SYSTEM AND METHOD FOR PRODUCING A HIGHER RESOLUTION STILL IMAGE FROM VIDEO INFORMATION

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for producing a high resolution still image. More particularly, embodiments of the invention relate to a technique for producing a high resolution still image from video output or from multiple images.

BACKGROUND OF THE INVENTION

Computer software for editing captured photographs has become widely used. Many users download photographs from a digital camera to a personal computer and execute photo editing software routines in order to improve the photographs. Techniques are provided in currently available photo editing software to crop photos, correct exposure, and perform redeye correction and other types of correction. Such techniques may be utilized in currently existing photo editing products such as Microsoft PictureIt or Microsoft DigitalImage, produced by the Microsoft Corporation of Redmond, Wash.

Software editing tools are also known for video output from image capturing devices such as digital video cameras, web cams, VCRs, and DVDs. Such editing tools often allow editing of audio and video components by adding background effects, varying volume, incorporating text, etc. Video cameras that are currently available on the market can take still images, but at lower resolution than still digital cameras. Therefore, most consumers prefer to purchase video cameras for creating video output and still digital cameras for capturing still images. Accordingly, although computer software provides convenient editing of both video and still images, currently existing software editing systems do not allow editing to bridge the gaps between the video and still image formats. In order to create a video, a user will use one image capturing device and in order to create a still image, a user will select another image capturing device.

A solution is needed for editing output from a single image capturing device to create high quality video and high quality still image output. A solution is also needed for removing the necessity for an individual to own both a video camera and a digital camera for capturing still images. Furthermore, a solution is needed for creating a single higher resolution image from multiple lower resolution images.

BRIEF SUMMARY OF THE INVENTION

Embodiments of the present invention are directed to a system for creating a higher resolution still image from a multiple video frames having a lower resolution. The system includes a sampling mechanism for extracting multiple video frames captured by a video recording device and an output mechanism for outputting a single high resolution still image from the multiple extracted video frames.

In yet a further aspect of the invention, a method is provided for implementing a video image capturing device in order to create a still image. The method includes selecting multiple frames captured by the video image capturing device and performing an analysis to determine if the selected frames can be combined into a higher resolution image. The method additionally includes combining the selected multiple frames to create a higher resolution still image if the analysis is positive and selecting new multiple frames if the analysis is negative.

In an additional aspect, a method is provided for implementing a video image capturing device in order to create a higher resolution still image from lower resolution video. The method includes intelligently selecting multiple frames captured by the video image capturing device by determining a difference between frames and selecting consecutive frames having a smallest difference. The method additionally includes combining the selected multiple frames to create a higher resolution still image.

BRIEF DESCRIPTION OF THE DRAWINGS

The present invention is described in detail below with reference to the attached drawings figures, wherein.

DETAILED DESCRIPTION OF THE INVENTION

I. System Overview

Embodiments of the invention include a method and system for resolution processing in order to create one high resolution image from multiple low resolution images. In a preferred embodiment, multiple frames of video output at low resolution are used to create a higher resolution digital still image. Although the system and method are described below in conjunction with digital embodiments, it is possible to implement techniques of the invention by digitizing input frames prior to processing.

Figure 1:
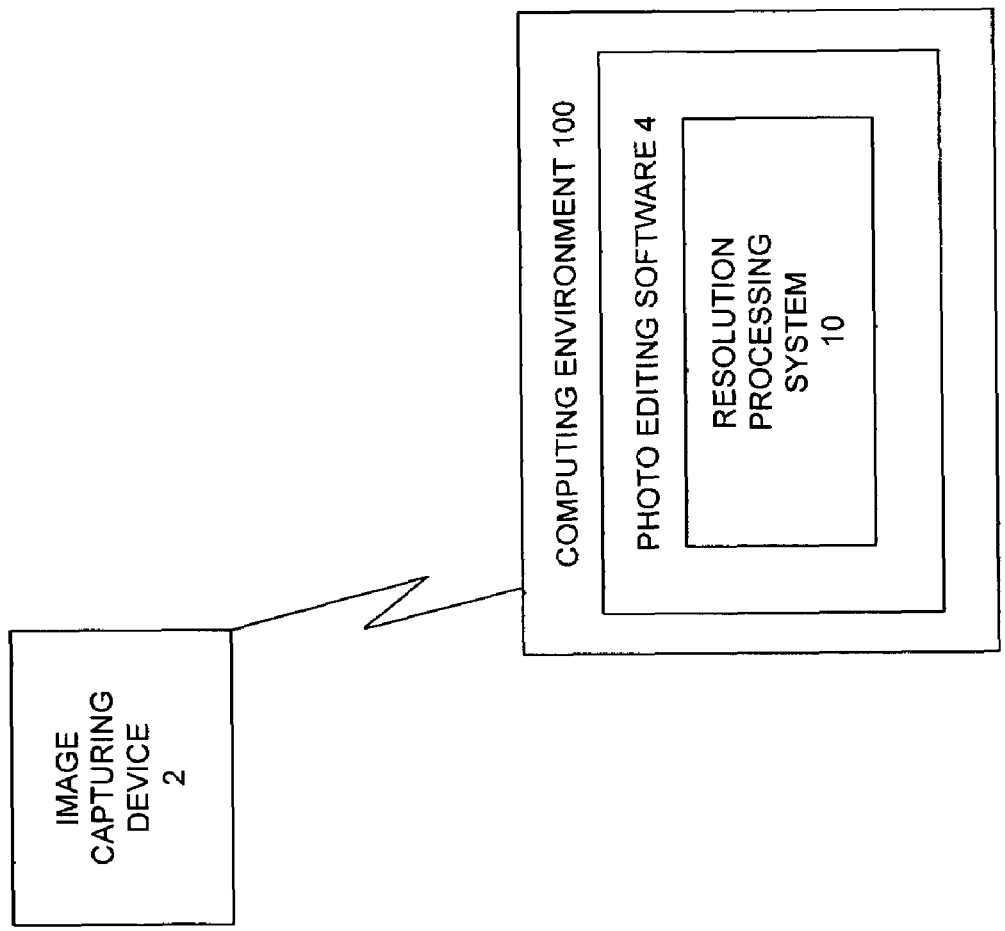
FIG. 1 is a block diagram illustrating an overview of a system in accordance with an embodiment of the invention.

FIG. 1 illustrates a system in accordance with an embodiment of the invention. An image capturing device 2 is connected with photo editing software 4 within a computing environment 100. The photo editing software includes a resolution processing system 10. As will be further explained below, the resolution processing system 10 is capable of taking multiple frames of video input and outputting a single higher resolution digital photograph.

II. Exemplary Operating Environment

Figure 2:
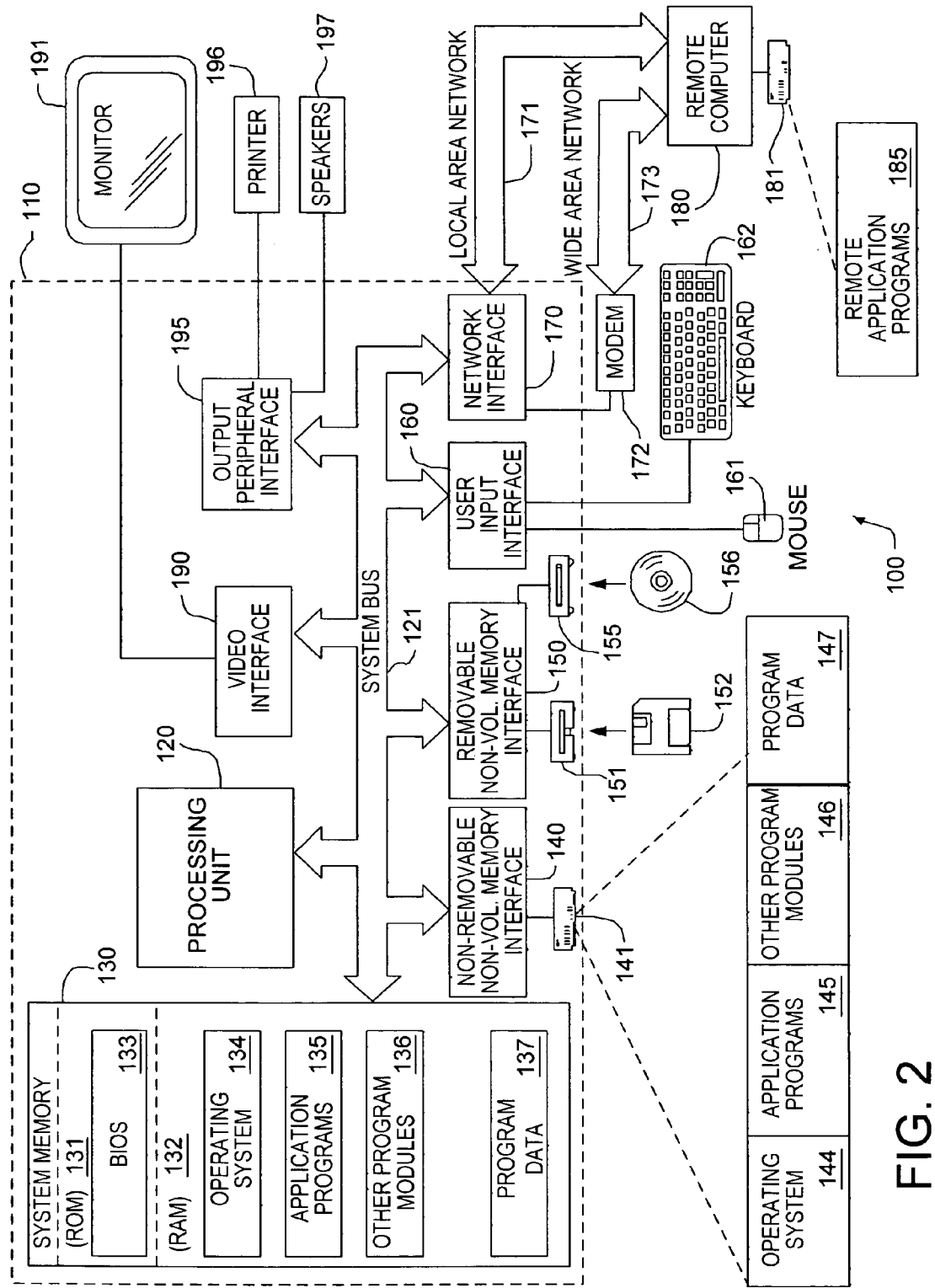
FIG. 2 is a block diagram illustrating a computerized environment in which embodiments of the invention may be implemented.

FIG. 2 illustrates an example of a suitable computing system environment 100 in which the photo editing software 4 and resolution processing system 10 may be implemented.

The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system including an image capturing device 2 that downloads captured images to a computing environment 100 including photo editing software 4 and a resolution processing system 10.

The image capturing device 2 may include a device for capturing video such as a camcorder or a VCR. In a preferred embodiment, the image capturing device 2 is a digital video camera, but it may also be an analog recorder. The image capturing device 2 downloads captured images through a wired or wireless connection with the computing environment 100.

Figure 3:
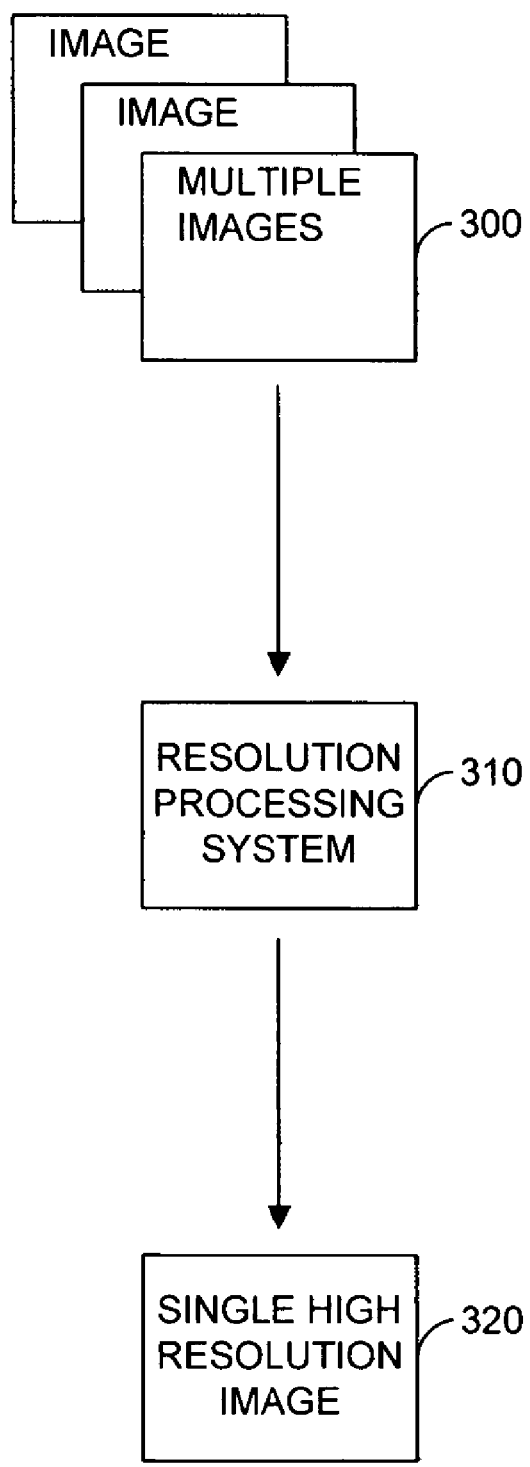
FIG. 3 is a diagram illustrating a process in accordance with an embodiment of the invention.

As shown in FIG. 3, multiple captured images 300 from the image capturing device 2 are typically directed to a resolution processing system 310 to produce a single high resolution image 320. In the currently described embodiment, the image capturing device 2 is a video camera that outputs multiple frames of images to producing a moving picture. The resolution processing system 310 utilizes the multiple images to produce a single still high resolution image 320.

Figure 4:
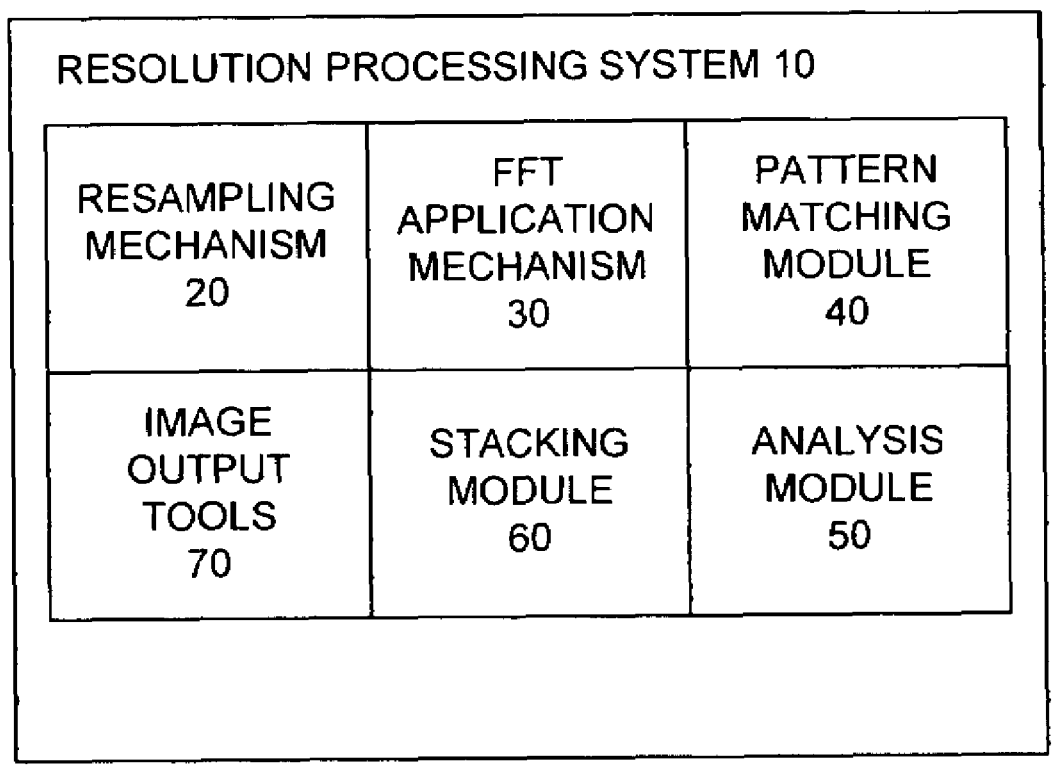
FIG. 4 is a block diagram illustrating a resolution processing system in accordance with an embodiment of the invention.

FIG. 4 illustrates components of the resolution processing system 10 in accordance with an embodiment of the invention. The resolution processing system 10 may include a re-sampling mechanism 20, a Fast Fourier Transform application mechanism 30, a pattern matching module 40, an analysis module 50, a stacking module 60, and image output tools 70.

The re-sampling mechanism 20 selects multiple frames of video output for input into the resolution processing system 10. The re-sampling mechanism 20 selects frames with the least change from each previous and successive frame and furthermore may select frames within an area of interest within the image. For instance, if the video camera 2 has captured a landscape scene, the re-sampling mechanism 20 selects the frames that are most alike, with the least change from the surrounding frames. The re-sampling mechanism 20 may select the entire image or merely a portion of the image that contains an object of particular interest. Accordingly, the re-sampling mechanism 20 is capable of selecting a smart combination of images that are capable of being combined to result in a high resolution image. The resolution processing system 10 relies on a smart combination of multiple images of the same scene in a manner that allows resolution to be increased. For example, while taking an image of a landscape including a relatively a still scene, the resolution processing system 10 can extract sequential frames from a video with less changing scene context and provide a higher resolution image than a still image taken with a video camera. The resolution processing system 10 using the re-sampling mechanism 20 and the analysis module 50 will be intelligent enough to suggest a time span within which captured video frames provide a possibility for extracting high resolution still images. If the captured image is not digital, the re-sampling mechanism 20 may incorporate or be connected with a converter to convert analog to digital images.

The Fast Fourier Transform (FFT) application mechanism 30 performs FFT on the sampled frames. The pattern matching module 40 applies pattern matching algorithms to assign a correct relative position of each image in the series. The analysis module 50 includes an algorithm for determining if the sampled frames are capable of producing a higher resolution image. The analysis module 50 and the re-sampling mechanism 20 interact to ensure that the selection of frames will result in a higher resolution image. The stacking module 60 stacks the multiple images in the series, and finally smoothes the resulting image if necessary. If only a portion of the scene has been selected, the stacking module 60 applies only to the selected area, which may be in a different position in each video frame. Variations of these image processing components are individually known in the art. The system as described can be assembled using existing algorithms and components.

The image output tools 70 output the final higher resolution image. The maximum resolution improvement for the output image is equal to a square root of the total number of frames input to the system. In other words, if nine frames are input, the output image can have a resolution that is three times that of the original image.

Figure 5:
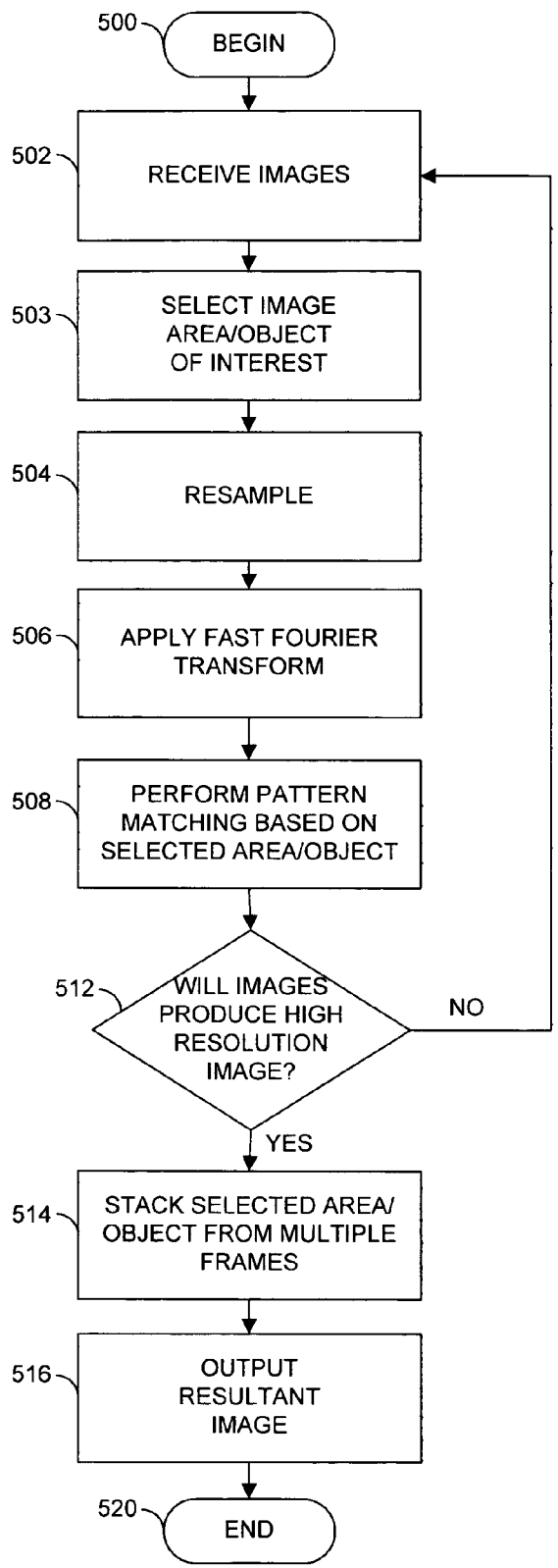
FIG. 5 is a flow chart illustrating a method for resolution processing in accordance with an embodiment of the invention.

FIG. 5 illustrates a method for resolution processing in accordance with an embodiment of the invention. The process begins in step 500. The resolution processing system 10 receives images from the image capturing device or from an image storage area in step 502. In step 503, the system selects an area or object of interest. The area or object of interest may be the entire image or only a portion of the image. In step 504, the re-sampling mechanism 20 of the resolution processing system 504 selects multiple image frames for sampling. In step 506, the FFT application mechanism 30 applies an FFT to the received frames. In step 508, the pattern matching module 40 performs pattern matching to assign a correct relative position to each frame in a series. In step 512, the analysis module 50 determines if the selected frames will produce a high resolution image. If not, the process returns to step 502 to receive additional images. If a high resolution image can be produced, the stacking module 60 stacks the images in step 514. If the area of interest selected in step 503 was less than the entire area of interest, then the stacking module 60 operates only on the selected area. In step 516, the image output tools 70 output the resultant high resolution image and the process ends in step 520. Accordingly, the system and method of the invention enable extraction of high resolution still images from video frames captured using a video camera.

Moreover, in an additional embodiment, the system can be used with a digital camera for obtaining high resolution images and taking high quality images of distant objects. Often when photographing distant objects, a digital camera zooming function will cause excessive noise. The technique of the invention can be applied to multiple still images taken using a zooming function with a digital camera. Enhancement through the resolution processing system 10 may cure effects of the atmospheric turbulence and noise introduced by the camera in digital zooming mode. The system combines the multiple still digital images as set forth above to eliminate the excessive noise and create a single high resolution still digital image.

With the resolution processing tools proposed, users will be able to take high quality and high resolution still images from their videos. The resolution processing tools will remove the necessity of having both video and still digital cameras. In addition, users will be able to obtain high resolution images from DVDs and MPEG and other video sources. If the resolution processing tools are implemented in currently available photo editing software products such as Microsoft PictureIt or Microsoft DigitalIImage, produced by the Microsoft Corporation of Redmond, Wash., the usefulness and power of these products will increase. Furthermore, media players such as Microsoft's Media Player could benefit from the proposed functionality.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for creating a higher resolution still image from multiple video images having a lower resolution, the system including a processor and one or more computer-storage media and comprising:
   a sampling mechanism for extracting multiple images captured by a video recording device, wherein each of the multiple extracted images comprises at least a portion of a video frame, and wherein each of the images comprises the same area of interest, the sampling mechanism intelligently selecting multiple images captured by the video image capturing device by determining a difference between images and selecting consecutive images having a smallest difference;
   an analysis module for determining if the extracted images can be combined into an image comprising a resolution that is higher than the resolution of each of the extracted multiple images, wherein if the extracted images cannot be combined into the higher resolution image the sampling mechanism extracts additional images captured by the video recording device;
   a stacking module for stacking the multiple extracted images to create a single higher resolution still image, wherein the still image comprises a combination of the multiple extracted images, and further wherein the still image has a higher resolution than any one of the selected images; and
   an output mechanism having image output tools for outputting the single higher resolution still image, wherein the high resolution still image has a resolution that is equal to a resolution of one of the selected images multiplied by a square root of the total number of multiple images selected.

2. The system of claim 1, further comprising a Fast Fourier Transform application module for applying a Fast Fourier Transform to each of the extracted images.

3. The system of claim 2, further comprising a pattern matching module for assigning a correct relative position of each of the extracted images.

4. The system of claim 1, further comprising a mechanism for converting analog input to digital input.

5. One or more computer-storage media having computer-executable instructions embodied thereon for performing a method for implementing a video image capturing device in order to create a higher resolution still image from multiple video images having a lower resolution the method comprising:
   receiving a plurality of video images from a video image capturing device, wherein the plurality of video images comprises a video recording of a scene;
   determining an area of interest, wherein the area of interest comprises a portion of the scene;
   intelligently selecting a series of multiple images captured by the video image capturing device, each image comprising at least a portion of a video frame containing the area of interest, wherein said selecting comprises determining a difference between images and selecting consecutive images having a smallest difference;
   performing pattern matching to assign a correct relative position of each image such that the area of interest in each image is aligned with the area of interest in each of the other images;
   performing an analysis to determine if the selected images can be combined to create a still image of the area of interest, wherein the still image has a higher resolution than the resolution of each of the selected images;
   stacking the portion of each of the selected multiple images having the area of interest to create the higher resolution still image of the area of interest if the analysis is positive and selecting a new series of multiple images if the analysis is negative, wherein said selecting comprises suggesting a time span associated with the video recording and for use in creating the still image having higher resolution;
   smoothing the higher resolution still image; and
   outputting the resultant single high resolution still image using image output tools, wherein the high resolution still image has a resolution that is equal to a resolution of one of the selected images multiplied by a square root of the total number of multiple images selected.

6. The method of claim 5, further comprising applying a Fast Fourier Transform to the selected images.

7. The method of claim 5, wherein the still image has a higher resolution than a still image taken with a video camera.

8. The media of claim 5, further comprising converting analog input to digital input.

9. A method for implementing a video image capturing device in order to create a single higher resolution still image from lower resolution video, the method comprising:
   intelligently selecting multiple images captured by the video image capturing device by determining a difference between images and selecting consecutive images having a smallest difference;
   analyzing the selected images to determine if the selected images can be combined into an image comprising a resolution that is higher than the resolution of each of the extracted multiple images;
   repeating the selecting and analyzing steps if the selected images cannot be combined to create an image of higher resolution than the resolution of each of the selected images;
   stacking the selected multiple images to create a single higher resolution still image, wherein the still image has a higher resolution than any one of the selected images; and
   outputting the resultant single high resolution still image using image output tools, wherein the high resolution still image has a resolution that is equal to a resolution of one of the selected images multiplied by a square root of the total number of multiple images selected.

10. The method of claim 9, further comprising applying a Fast Fourier Transform to the selected images.

11. The method of claim 9, further comprising performing pattern matching to assign a correct relative position to each image in a series.

12. The method of claim 9, further comprising converting analog input to digital input.

* * * * *